(12) United States Patent
Jung (10) Patent No.: US 8,290,186 B2
(45) Date of Patent: Oct. 16, 2012

(54) METHOD AND APPARATUS FOR CONTROLLING PORTABLE AUDIO DEVICE

(75) Inventor: Ji-woon Jung, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1296 days.

(21) Appl. No.: 11/924,918

(22) Filed: Oct. 26, 2007

(65) Prior Publication Data
US 2008/0208376 A1 Aug. 28, 2008

(30) Foreign Application Priority Data
Feb. 26, 2007 (KR) .................. 10-2007-0019154

(51) Int. Cl.
*H04R 5/02* (2006.01)
*H04R 1/10* (2006.01)
*H04B 3/00* (2006.01)
*H04B 5/00* (2006.01)
*G06F 17/00* (2006.01)

(52) U.S. Cl. .............. 381/311; 381/74; 381/77; 381/79; 381/81; 381/309; 700/94

(58) Field of Classification Search .............. 381/2, 74, 381/77, 79–81, 309, 311; 700/94
See application file for complete search history.

(56) References Cited

U.S. PATENT DOCUMENTS

| | | | |
|---|---|---|---|
| 5,220,681 A * | 6/1993 | Belgin | ........................ 455/156.1 |
| 2003/0088326 A1 * | 5/2003 | Du et al. | ........................ 700/94 |
| 2004/0106424 A1 * | 6/2004 | Yoshizawa | .................... 455/522 |
| 2004/0157555 A1 * | 8/2004 | Richenstein et al. | .......... 455/39 |
| 2006/0294520 A1 * | 12/2006 | Anderson | ...................... 718/100 |
| 2007/0243851 A1 * | 10/2007 | Shoarinejad et al. | ....... 455/343.2 |
| 2008/0082838 A1 * | 4/2008 | Achariyakosol et al. | ..... 713/300 |
| 2008/0102770 A1 * | 5/2008 | Froehling et al. | .......... 455/187.1 |

FOREIGN PATENT DOCUMENTS

| | | | |
|---|---|---|---|
| JP | 2006205795 A | * | 8/2006 |
| KR | 10-2004-0069516 A | | 8/2004 |
| KR | 10-2005-0073958 | | 7/2005 |
| KR | 10-2006-0042762 | | 5/2006 |
| KR | 10-2007-0020952 A | | 2/2007 |

OTHER PUBLICATIONS

Korean Office Action issued Mar. 4, 2011 in corresponding Korean Patent Application 10-2007-0019154.
Korean Notice of Allowance for corresponding Korean Application No. 10-2007-0019154 dated Nov. 30, 2011.

* cited by examiner

*Primary Examiner* — Mohamad Musleh
*Assistant Examiner* — Tsz Chan
(74) *Attorney, Agent, or Firm* — Staas & Halsey LLP (57) ABSTRACT

A method to control a portable audio device in a power-saving mode using a wireless headset includes transmitting a host wake-up signal (HOST_WAKEUP) according to a signal requesting reproduction of music transmitted from the wireless headset, transmitting a control signal corresponding to the host wake-up signal, and controlling the portable audio device according to the control signal to switch the portable audio device out of the power-saving mode and to supply power to at least one component in the portable audio device used to reproduce music.

24 Claims, 4 Drawing Sheets

METHOD AND APPARATUS FOR CONTROLLING PORTABLE AUDIO DEVICE

CROSS-REFERENCE TO RELATED APPLICATION

This application claims the benefit of Korean Patent Application No. 2007-19154, filed on Feb. 26, 2007, in the Korean Intellectual Property Office, the disclosure of which is incorporated herein in its entirety by reference.

BACKGROUND OF THE INVENTION

1. Field of the Invention

Aspects of the present invention relate to a method and apparatus for controlling a portable audio device, and more particularly, to a method and apparatus for controlling a portable audio device in a power-saving mode, by using a wireless headset or earphones.

2. Description of the Related Art

Portable audio devices such as MP3 players, CD players, portable media players (PMP), and digital multimedia broadcasting (DMB) players are widely used and becoming increasingly popular. In terms of mobility and portability of portable audio devices, it is important to have a reliable and efficient power management system (PMS) to supply power to the portable audio devices. The PMS relies on a power management unit (PMU) technique which uses a central processing unit (CPU), and implements a low-power design by preventing the power from being transmitted to most of the components in the device, including the CPU, when the device is not being used to reproduce audio files, for example, when the device is in a sleep mode.

However, even when the device is not being used to reproduce audio files, power is supplied to certain components which consume small amounts of power and are essential to restart the system, or should otherwise not be turned off for various reasons. Examples of these components include a real-time clock (RTC) and a microcomputer (MICOM).

Recently, users have begun using wireless headsets with these portable audio devices. In order to listen to music stored on a portable audio device with a wireless headset or earphones when the portable audio device is in the low-power state described above, power is initialized when the wireless headset or earphones are turned on by a user, and a modem is operated for an inquiry scan or a page scan. Then, the portable audio device has to be restarted manually, the modem of the portable audio device is operated, the wireless channels in which the wireless headset or earphones communicate with the portable audio device are found and selected by the modem, and a song is selected using a user interface.

However, this conventional process takes an unnecessary amount of work. Since this process is too laborious, a more convenient process is desirable. Specifically, a process which allows the user to initialize an audio device without manually restarting the main body of the audio device is desirable, so that the user can reproduce and listen to music more easily.

SUMMARY OF THE INVENTION

Aspects of the present invention provide a method and apparatus to control a portable audio device in a power-saving mode when using a wireless headset, without manually initializing the portable audio device.

According to an aspect of the present invention, a method of controlling a portable audio device in a power-saving mode using a wireless headset includes transmitting a host wake-up signal (HOST_WAKEUP) according to a signal requesting reproduction of an audio file transmitted by the wireless headset, transmitting a control signal corresponding to the host wake-up signal, and controlling the portable audio device according to the control signal to switch the portable audio device out of the power-saving mode and to supply power to at least one component in the portable audio device used to reproduce the audio file.

According to another aspect of the present invention, a method of controlling a portable audio device by using a wireless headset, where the portable audio device is initially in a state in which power of an audio codec unit of the portable audio device is turned off and a wireless communication unit of the portable audio device is set to a low-power mode, includes sensing a signal transmitted by the wireless headset requesting reproduction of an audio file, transmitting a host wake-up (HOST_WAKEUP) signal according to the sensed signal requesting the reproduction of the audio file, transmitting a control signal I to a power control unit of the portable audio device according to the host wake-up signal to supply power to the audio codec unit, transmitting a reset signal to initialize the audio codec unit, performing at least one of decoding or encoding of the audio file according to the reset signal using the audio codec unit to which the power is supplied, transmitting the audio file on which at least one of the decoding or the encoding has been performed to the wireless communication unit through a host interface; and transmitting the audio file on which at least one of the decoding or the encoding has been performed to the wireless headset using the wireless communication unit.

According to another aspect of the present invention, an apparatus to control a portable audio device in a power-saving mode using a wireless headset includes a wireless communication unit of the portable audio device to transmit a host wake-up signal (HOST_WAKEUP) according to a signal transmitted by the wireless headset requesting reproduction of an audio file, a logic circuit unit of the portable audio device to transmit a control signal corresponding to the host wake-up signal transmitted by the wireless communication unit, and a power control unit of the portable audio device to control the portable audio device according to the control signal transmitted by the logic circuit unit by switching the portable audio device out of the power-saving mode and supplying power to at least one component used to reproduce the audio file.

According to still another aspect of the present invention, a computer readable recording medium includes a computer readable program with processing instructions for executing the methods.

Details and improvements of aspects of the present invention are described in dependent claims.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
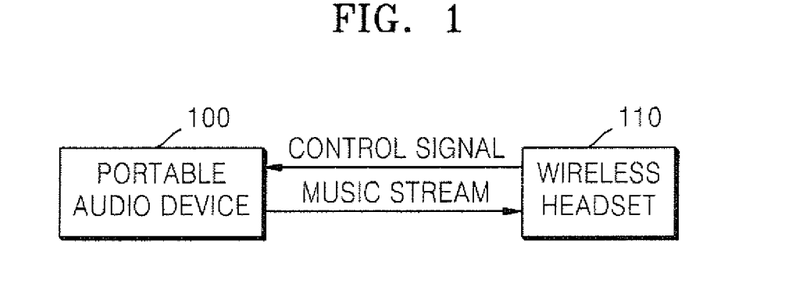
FIG. 1 is a schematic block diagram illustrating a system to control a portable audio device by using a wireless headset according to an embodiment of the present invention.

FIG. 1 is a schematic block diagram illustrating a system 10 to control a portable audio device 100 by using a wireless headset 110 according to an embodiment of the present invention. Referring to FIG. 1, the system 10 includes a portable audio device 100 and a wireless headset 110. It is understood that the system 10 may include other audio and/or video components in addition to those shown in FIG. 1 and described below.

Aspects of the present invention may be applied to an environment in which the portable audio device 100 is in a low-power state and is used with the wireless headset 110. More specifically, according to aspects of the present invention, power is supplied to an audio codec, a memory, and the like in a low-power state, thereby waking up the system 10 to automatically reproduce music to be listened to by a user. However, it is understood that aspects of the present invention are not limited to this environment, and may also be applied to various other environments. For example, aspects of the present invention may also be applied to other types of audio devices, such as stereos, and/or other types of non-audio devices which engage in wireless communication, such as computers.

The portable audio device 100 may be one of an MP3 player, a CD player, a portable media player (PMP), a digital multimedia broadcasting (DMB) player, or the like. The portable audio device 100 has a wireless communication unit 210 to communicate with the wireless headset 110.

The wireless headset 110 may include various components, including a microphone (not shown), earphones (not shown), a communication module (not shown) to enable wireless communication with the portable audio device 100, and a user interface (not shown). A signal requesting reproduction of music files is transmitted to the audio device 100 through the user interface, thereby waking up the system 10 when the system 10 is in a low-power state, such as a sleep mode, so the system 10 can automatically reproduce the music file for the user. The wireless headset 110 converts received audio files wirelessly transmitted from the portable audio device 100 into actual sound.

The wireless headset 110 may be embodied in various forms. For example, the wireless headset 110 may be a wireless headset having a frame, or may instead have a pair of wireless earphones that can be directly inserted into the ears of a user. Furthermore, if the wireless headset 110 has a frame, the frame may be embodied in various designs, such as a frame that fits over the head, a frame that fits behind the head for athletics, etc. However, the wireless headset 100 according to other aspects of the present invention is not limited thereto, and various other types of wireless headsets 100 may be used.

As illustrated in FIG. 1, a control signal is transmitted from the wireless headset 110 to the portable audio device 100. When the control signal is transmitted through a user interface, for example, predetermined key buttons or a touch-type input device, the portable audio device 100 loads music files onto a memory unit, such as a DRAM, a flash memory, etc., in an order in which the music files. The music files may be arranged in various ways, for example, according to a reproduction list of music files which were recently listened to, according to a saved playlist, or according to some other predetermined criterion. Then, the portable audio device 100 reproduces the music files, and transmits a music stream of the music files to the wireless headset 110.

Figure 2:
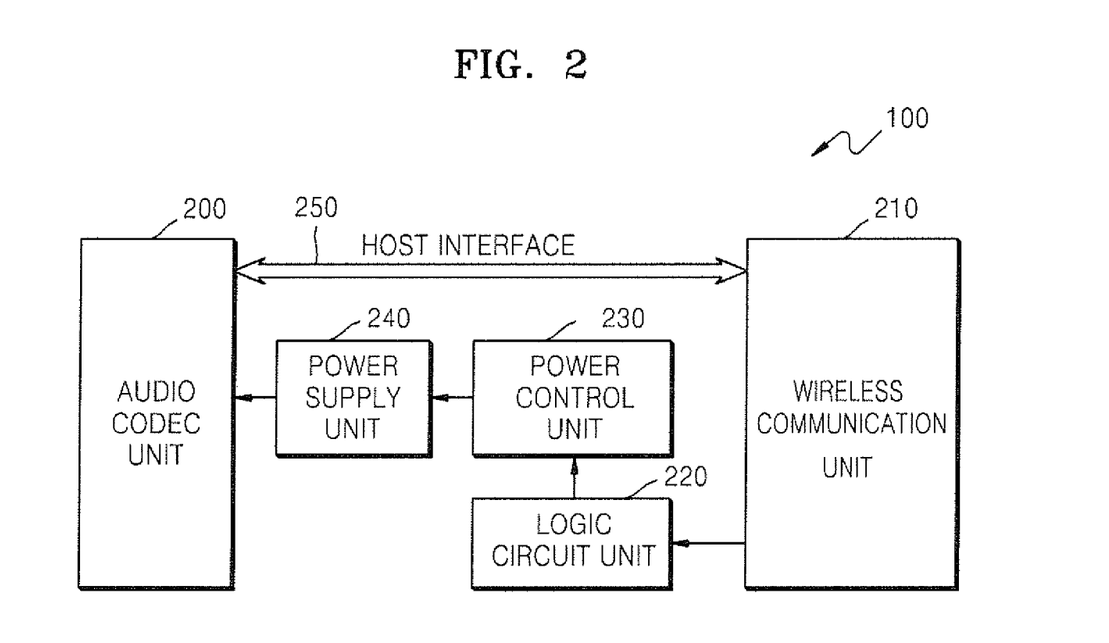
FIG. 2 is a schematic block diagram of the portable audio device illustrated in FIG. 1.

FIG. 2 is a schematic block diagram of the portable audio device 100 illustrated in FIG. 1. Referring to FIG. 2, the portable audio device 100 includes an audio codec unit 200, a wireless communication unit 210, a logic circuit unit 220, a power control unit 230, a power supply unit 240, and a host interface 250.

The audio codec unit 200 includes programs having mathematical logic functions to compress and restore digital audio files, i.e. compression and restoration algorithms, and includes a software codec and/or a hardware codec. The audio codec unit 200 has a dedicated audio decoder to decode various types of compressed audio files, such as, for example, MP3, WMA, AC-3, or OGG, a system or system-on-chip to decode audio using software of a digital signal processor or a CPU, and an ANV decoder to decode video files. Also, when the bandwidth is limited by the wireless communication unit 210, or when a music file is compressed, the audio codec unit 200 includes an MP3 encoder or a sub-band coding (SBC) encoder to encode audio. It is understood that when the audio codec unit 200 is described as being capable of decoding or encoding of an audio file, the audio codec unit 200 may perform either decoding or encoding individually, or alternatively, may perform a combination of both decoding and encoding. Thus, the audio codec unit 200 is not limited to performing only one of decoding or encoding.

The wireless communication unit 210 is an audio gateway apparatus to input and output audio to and from the portable audio device 100. The wireless communication unit 210 receives a transmitted music stream transmitted from the audio codec unit 200 through the host interface 250. The wireless communication unit 210 communicates with the external wireless headset 110 through a communication method, such as Bluetooth, WiFi, or Zigbee. Also, according to another aspect of the present invention, the wireless communication unit 210 includes a system to implement lower layers of an open system interconnection (OSI) communication model. As noted above, the wireless headset 110 includes a communication module (not shown) to communicate with the wireless communication unit 210. The communication module may be the same type of component as the wireless communication unit 210, although is not limited thereto.

The logic circuit unit 220 controls a power management system (PMS), and includes at least one of a complex programmable logic device (CPLD), a microcomputer (MICOM), or a dedicated chip to control the power management system (PMS).

Power is transmitted to the logic circuit unit 220 even when the system 10 is in a low-power state, such as a sleep mode. If a HOST_WAKEUP signal transmitted by the wireless communication unit 210 is received by the portable audio device 100, the logic circuit unit 220 transmits a HIGH signal to the power control unit 230. Also, when power is supplied to the audio codec unit 200, a system reset signal is transmitted to the audio codec unit 200 to enable the portable audio device 100 to reproduce music files.

The power control unit 230 includes a DC/DC converter which has pins to control an enable/disable function, and a switch to switch power modes. Specifically, the power control unit 230 switches a connection from a MASTER_POWER mode to a SLAVE_POWER mode according to a HIGH signal of the logic circuit unit 220.

The power supply unit 240 transmits power to each block, or component, of the system 10. In a low-power state, the power supply unit 240 transmits a power designated as MASTER_POWER to major components, for example, the wireless communication unit 210, the logic circuit unit 220 and the power control unit 230. Also, the power supply unit 240 transmits a power designated as SLAVE_POWER to the audio codec unit 200 according to a control of the power control unit 230.

The host interface 250 is an interface between the audio codec unit 200 and the wireless communication unit 210. The host interface 250 includes dedicated digital interfaces, such as a serial peripheral interface (SPI), a universal asynchronous receiver/transmitter (UART), and a universal serial bus (USB). It is understood that other dedicated digital interfaces may also be used to implement the host interface 250.

Figure 3:
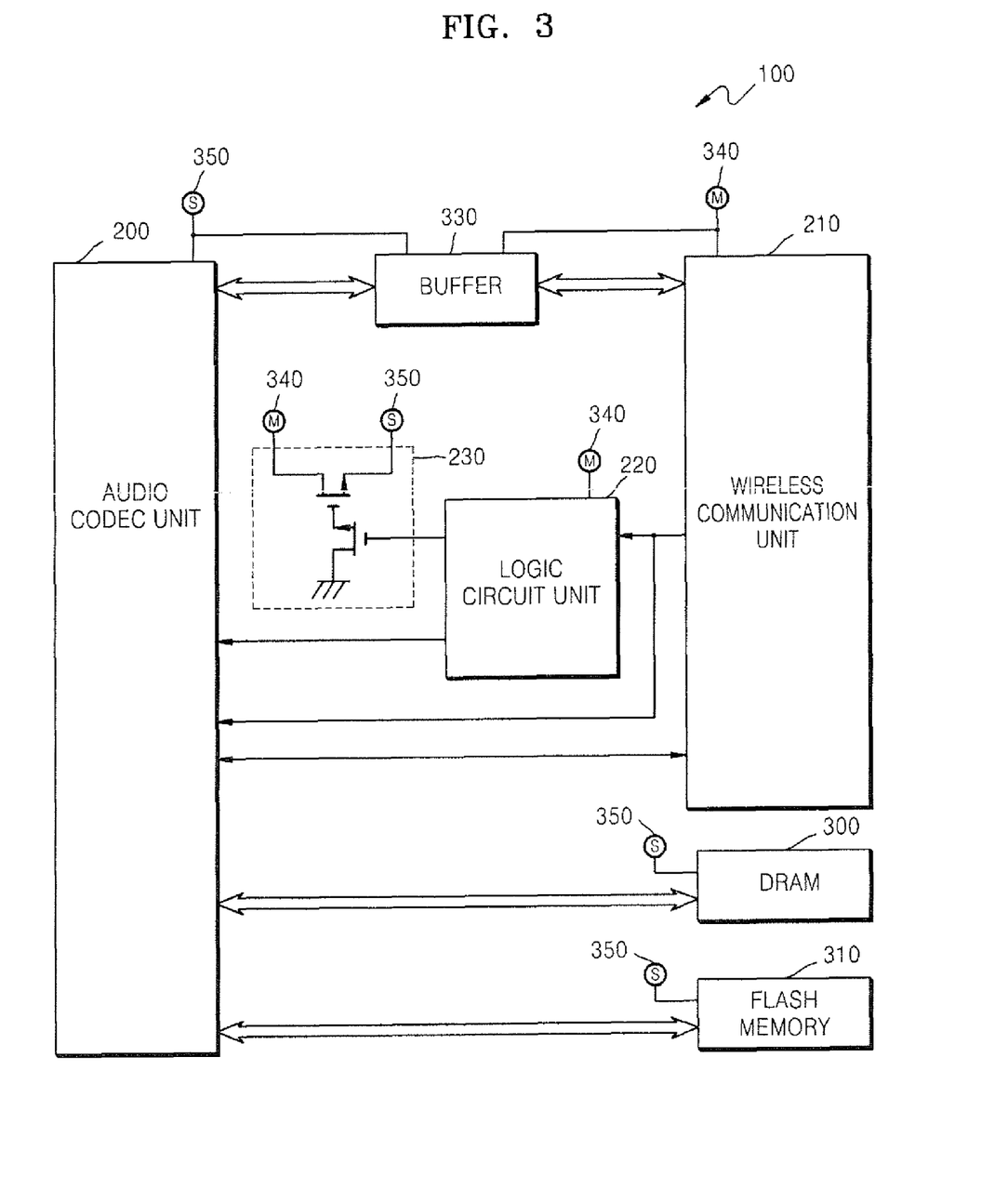
FIG. 3 is a detailed block diagram illustrating a structure of the portable audio device illustrated in FIG. 1.

FIG. 3 is a detailed block diagram illustrating a structure of the portable audio device 100 illustrated in FIG. 1. According to an aspect of the present invention, the default state of the system 10 is a power-saving mode, i.e. a state in which power is turned off in the audio codec unit 200 and a variety of peripheral circuits, such as, for example, a sleep mode. However, even when the system 10 is in the power-saving mode, power is still applied to the wireless communication unit 210, the logic circuit unit 220, and the power control unit 230. This power-saving mode is expressed by a block 340 labeled "M" for MASTER_POWER 340. On the other hand, when power is supplied to the audio codec unit 200 and the peripheral circuits, the portable audio device switches to a normal mode, represented by a block 350 labeled "S" for SLAVE_POWER. The block 340 representing the MASTER_POWER 340 mode is turned on even when the system 10 is in the power-saving mode, while the block representing the SLAVE_POWER 350 mode is turned off in the power-saving mode.

In this default state, the wireless communication unit 210 is in a low-power mode, but maintains a wireless connection with the wireless headset 110. For example, when Bluetooth is used to establish the wireless connection, the wireless communication unit 210 constantly maintains a wireless connection with the wireless headset 110 in a low-power mode, such as sniff mode or park mode, and periodically enters into an active mode or a reception mode, thereby receiving a wake-up signal transmitted from the wireless headset 110. According to the Bluetooth specification, the sniff mode is a mode in which packet exchange is sensed in each of a plurality of predetermined time intervals, and the park mode is a mode to minimize power consumption of a slave device wirelessly connected to a master device.

Also, even in a state in which the wireless connection between the wireless headset 110 and the portable audio device 100 is not maintained, the wireless communication unit 210 may periodically wake up and transmit an inquiry or a page message to the wireless headset 110, thereby receiving a wake-up signal. The wireless communication unit 210 receives a signal to operate the audio device from the wireless headset 110, for example, a play key or an input signal corresponding to the play key, and transmits a host wake-up (HOST_WAKEUP) signal to the logic circuit unit 220, thereby waking up various system blocks, or components. If no signal is received, the wireless communication unit 210 returns to the low-power mode, for example, the sniff mode or the park mode. When this operation is performed in Bluetooth, for example, the system 10 consumes a few dozen microwatts of power at most and even though power is still applied in a low-power state, power consumption is minimal.

The logic circuit unit 220 transmits a control signal to the power control unit 230 corresponding to the host wake-up (HOST_WAKEUP) signal transmitted from the wireless communication unit 210. According to an aspect of the present invention, the control signal is a logic signal in the form of a HIGH or LOW signal. However, it is understood that other types of signals may instead be used for the logic signal.

The logic circuit unit 220 is responsible for power management of the system 10. Specifically, the logic circuit unit 220 performs power control or initialization of each of the blocks, or components, of the system 10. Accordingly, the logic circuit unit 220 should always be turned on. Thus, as described above, MASTER_POWER 340 is supplied to the logic circuit unit 220, because MASTER_POWER 340 is supplied even when the system 10 is in a low-power state. In addition to the logic circuit unit 220, MASTER_POWER 340 is additionally supplied to the wireless communication unit 210, the power control unit 230, and a buffer 330. However, it is understood that MASTER_POWER 340 is not required to be supplied to each of these components, and that the components to which MASTER_POWER 340 is supplied may differ according to other aspects of the present invention.

MASTER_POWER 340 is also supplied to a real-time clock (RTC, not shown), and a microcomputer (MICOM, not shown).

Referring to FIGS. 2 and 3, blocks, or components, to which SLAVE_POWER 350 is supplied include, for example, the audio codec unit 200, a DRAM 300, and a flash memory 310. According to an aspect of the present invention, SLAVE_POWER 350 indicates that power is not supplied in a power-saving mode, i.e., that power is supplied in a full operation mode. While shown as a DRAM 300 in FIG. 3 as an example, it is understood that other types of memories may also be used according to other aspects of the present invention, such as eDRAM, SRAM, and other types of nonvolatile memories.

The power control unit 230 receives a control signal transmitted by the logic circuit unit 220. According to the control signal, the power control unit 230 switches a connection from MASTER_POWER 340 to SLAVE_POWER 350, thereby supplying power to blocks, or components, to which power is not supplied in a power-saving mode, such as the audio codec unit 200, the DRAM 300, and the flash memory 310.

When power is supplied to the audio codec unit 200, music files are decoded according to predetermined criteria, for example, in a predetermined order in a play list, and the decoded files are transmitted to the wireless communication unit 210 through the host interface 250. The wireless communication unit 210 performs processes such as encryption, channel-encoding, and modulation of the music files transmitted from the audio codec unit 200 to enable the music files to be transmitted through wireless communication channels, and then transmits a music stream of the music files to the wireless headset 110. It is understood that audio data other than music files arranged in a playlist may also be transmitted from the wireless communication unit 210 to the wireless headset 110, such as prerecorded dialogue, radio, etc.

The host interface 250 is a universal asynchronous receiver/transmitter (UART). A UART is a microchip containing a program to control an interface using serial apparatuses connected to a computer. Also, the host interface 250 includes the buffer 330 to synchronize a data stream between the audio codec unit 200 and the wireless communication unit 210. The buffer 330 buffers the music stream transmitted from the audio codec unit 200 in order to synchronize the data stream with the wireless communication unit 210, and transmits the music stream to the wireless communication unit 210.

Figure 4:
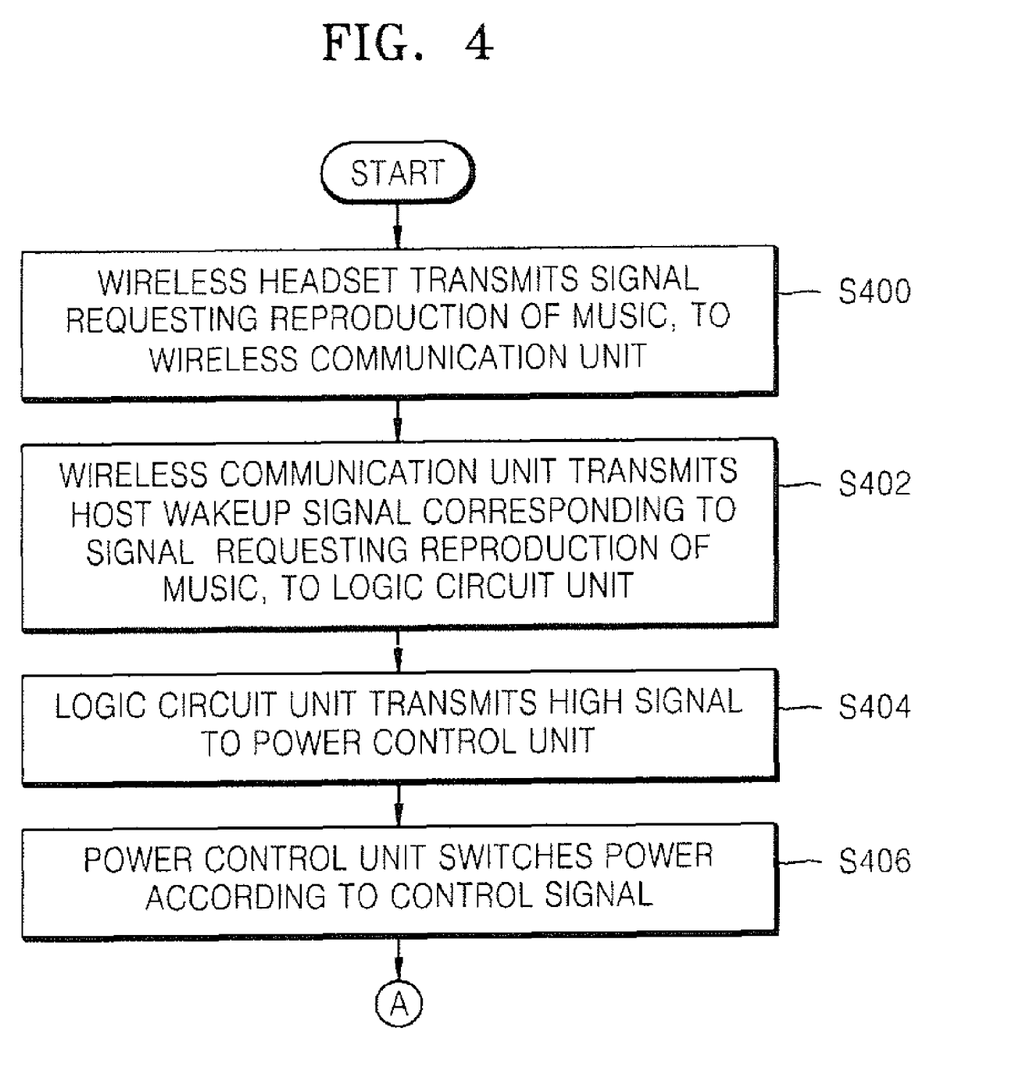
FIG. 4 is a flowchart illustrating a method of controlling a portable audio device in a low-power state using a wireless headset, according to an embodiment of the present invention.

FIG. 4 is a flowchart illustrating a method of controlling the portable audio device 100 in a low-power state using the wireless headset 110, according to an embodiment of the present invention. In order to describe the method of controlling the portable audio device 100, an example of a conventional method of controlling a conventional portable audio device (not shown) using a Bluetooth headset will also be explained.

Conventionally, when a user presses a button on the Bluetooth headset to reproduce music, the Bluetooth headset transmits an interrupt signal to the main body of a conventional portable audio device requesting reproduction of the music. According to the interrupt signal, the CPU or digital signal processor (DSP) of an audio codec unit in the conventional portable audio device receives a HOST_WAKEUP signal, and reproduces music in a predetermined order of a play list, or according to some other criteria. Then, the reproduced music stream is compressed in real-time according to a compression technique, such as sub-band coding (SBC) or MP3, and is transmitted to the Bluetooth headset through a Bluetooth channel. Then, the Bluetooth headset decompresses the music stream and reproduces music.

Unlike the conventional method, in the current embodiment, power is not supplied to the portable audio device 100 including the audio codec unit 200, so the process of reproducing a music file is not performed as described above.

Referring to FIG. 4, in operation S400, the wireless headset 110 transmits a signal requesting reproduction of music to the wireless communication unit 210. For example, when the user presses a button on the wireless headset 110 to reproduce music, a corresponding signal requesting reproduction of music is transmitted to the wireless communication unit 210.

In operation S402, the wireless communication unit 210 transmits a host wake-up signal (HOST_WAKEUP), corresponding to the signal requesting reproduction of music, to the logic circuit unit 220. According to the conventional technology, unless power is turned off in an audio codec unit of the conventional portable audio device, the HOST_WAKEUP signal is received by the CPU or DSP in the audio codec unit of the conventional portable audio device, and music is reproduced in a predetermined order of a play list. However, according to an aspect of the present invention, in the power-saving mode the audio codec unit 200 is turned off and cannot receive the HOST_WAKEUP signal. Accordingly, the logic circuit unit 220 processes the signal (HOST_WAKEUP), because the logic circuit unit 220 is turned on even when the system 10 is in a low-power mode, such as a sleep mode.

In operation S404, the logic circuit unit 220 transmits a control signal corresponding to the HOST_WAKEUP signal to the power control unit 230. The control signal is a HIGH signal.

In operation S406, according to the control signal, the power control unit switches a power connection from MASTER_POWER to SLAVE_POWER. Accordingly, power is supplied to blocks, or components, required to reproduce music, such as the audio codec unit 200 and the DRAM 300.

Figure 5:
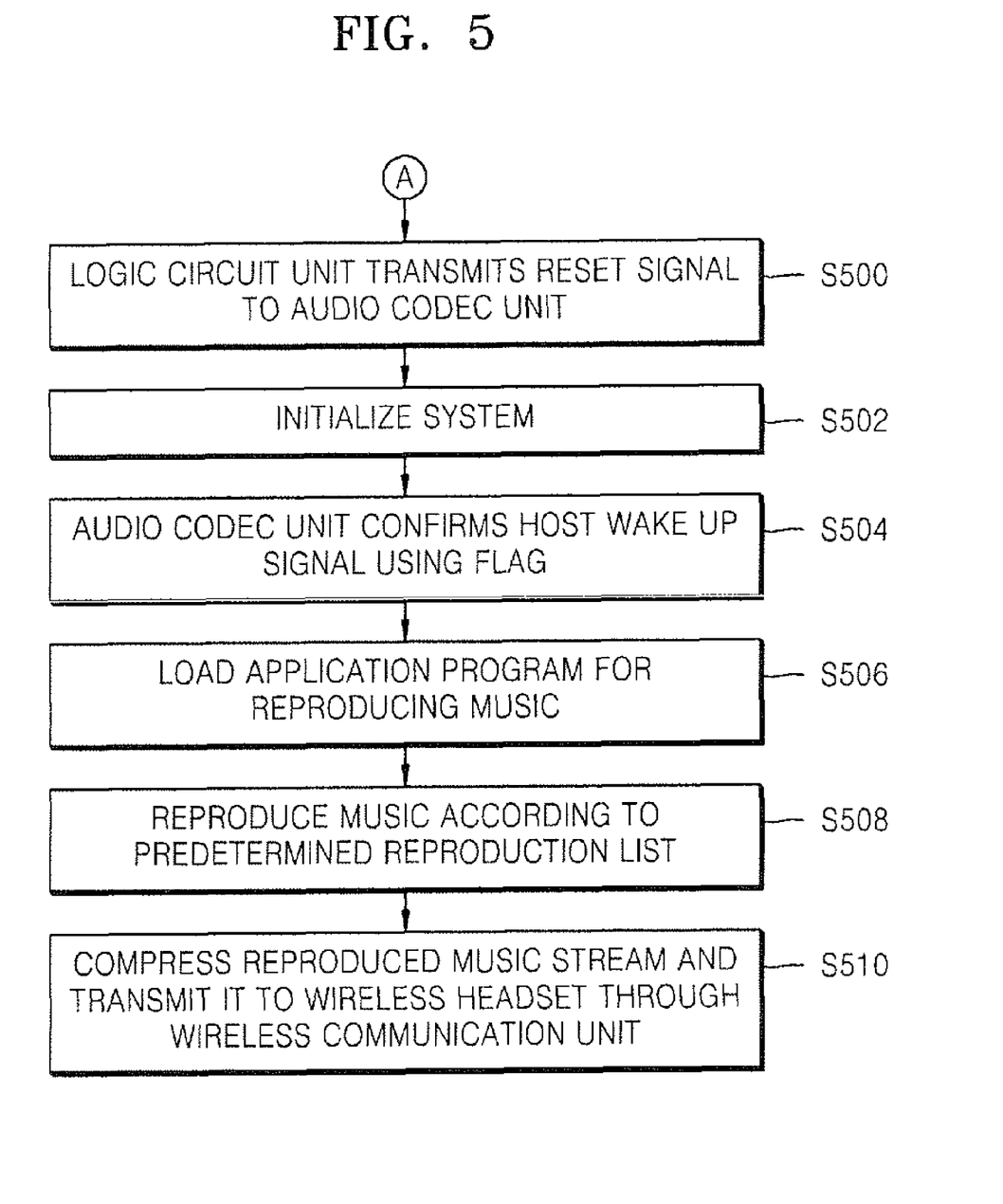
FIG. 5 is a flowchart illustrating a method of controlling a portable audio device in a low-power state using a wireless headset, according to an embodiment of the present invention.

FIG. 5 is a flowchart illustrating a method of controlling the portable audio device 100 in a low-power state using the wireless headset 110, according to an embodiment of the present invention. While illustrated as a separate embodiment from the embodiment shown in FIG. 4, the embodiment shown in FIG. 5 may be combined with the embodiment shown in FIG. 4 to subsequently follow the operations performed in FIG. 4. For example, after operations S400, S402, S404 and S406 in FIG. 4 are performed, operations S500, S502, S504, S506, S508 and S510 may then be respectively performed. Referring to FIG. 5, at operation S500, when power is supplied to blocks used to reproduce music, such as the audio codec unit 200, using the process illustrated in FIG. 4, the logic circuit unit 220 transmits a reset signal to the audio codec unit 200.

In operation S502, the system 10 is initialized based on the reset signal transmitted by the logic circuit unit 220. In operation S504, the audio codec unit 200 begins the initialization process by confirming the presence of the request to reproduce music, i.e, confirms that the HOST_WAKEUP signal has been transmitted, using a flag. In operation S506, the audio codec unit 200 loads an application program to reproduce music.

In operation S508, music is reproduced according to a predetermined play list using the application program loaded in S506. In operation S510, the reproduced music stream is compressed in real-time according to a compression technique, such as subband coding (SBC) or MP3 coding, and transmitted to the wireless headset 110 through a wireless channel, for example, a Bluetooth channel. The wireless headset 110 decompresses the music stream and reproduces the music files included in the music stream.

According to aspects of the present invention, a host wake-up (HOST_WAKEUP) signal is automatically generated and transmitted according to a signal transmitted by a wireless headset requesting reproduction of music, and a control signal corresponding to the host wake-up signal is automatically transmitted to reproduce an audio file.

As a result, aspects of the present invention provide a way to supply power to blocks, or components, of the portable audio device 100 which are used to reproduce the audio file when the portable audio device 100 is in a power-saving mode. Thus, the portable audio player can be controlled by using only the wireless headset 110, even when the portable audio device 100 is in the power-saving mode.

Thus, aspects of the present invention provide a way for users to initialize the main body of the portable audio device 100 using only the wireless headset 110 to automatically reproduce and listen to music, even when the main body of the portable audio device 100 is in the power-saving state. Accordingly, the process of using the wireless headset 110 and the portable audio device 100 to reproduce an audio file according to aspects of the present invention is more convenient than the conventional process, and is very useful when the portable audio device 100 is located in a place which is inconvenient to access, such as in a bag or a pocket Aspects of the present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

Also, functional programs, codes, and code segments for accomplishing aspects of the present invention can be easily construed by programmers skilled in the art to which aspects of the present invention pertain.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of controlling a portable audio device in a power-saving mode using a wireless headset, the method comprising:
   transmitting a host wake-up signal (HOST_WAKEUP) according to a signal requesting reproduction of an audio file transmitted by the wireless headset;
   transmitting a control signal corresponding to the host wake-up signal; and
   controlling the portable audio device according to the control signal to switch the portable audio device out of the power-saving mode and to supply power to at least one component in the portable audio device used to reproduce the audio file,
   wherein the power is not supplied to the at least one component in the portable audio device used to reproduce the audio file when the portable audio device is in the power-saving mode.

2. The method of claim 1, further comprising:
   reproducing the audio file using an audio codec unit to which the power is supplied when the portable audio device is out of the power-saving mode;
   transmitting the audio file to a wireless communication unit of the portable audio device; and
   transmitting the audio file to the wireless headset through a wireless channel.

3. The method of claim 1, wherein after the controlling of the portable audio device, the method further comprises:
   supplying power to an audio codec unit of the portable audio device in the power-saving mode according to the control signal;
   transmitting a reset signal to initialize the audio codec unit;
   performing at least one of decoding or encoding of the audio file using the audio codec unit;
   transmitting the audio file on which at least one of the decoding or the encoding has been performed to a wireless communication unit of the portable audio device through a host interface; and
   transmitting the audio file on which at least one of the decoding or the encoding has been performed to the wireless headset through a predetermined wireless channel using the wireless communication unit.

4. The method of claim 2, wherein the power saving mode comprises one of a sniff mode or a park mode.

5. The method of claim 2, wherein the wireless communication unit of the portable audio device periodically transmits an inquiry or a page message to the wireless headset when the wireless communication unit and the wireless headset are in a state in which the wireless communication unit is not wirelessly connected to the wireless headset.

6. The method of claim 1, wherein the controlling of the portable audio device comprises supplying power to the at least one component used to reproduce the audio file by switching a connection from a MASTER_POWER mode to a SLAVE_POWER mode according to the control signal, wherein in the MASTER_POWER mode, the power is not supplied to the at least one component, and in the SLAVE_POWER mode, the power is supplied to the at least one component.

7. The method of claim 1, wherein the at least one component required to reproduce the audio file includes at least one of an audio codec unit, a DRAM, a hard disk drive (HDD), or a flash memory.

8. The method of claim 1, wherein the portable audio device comprises at least one of an MP3 player, a CD player, a portable media player (PMP), or a digital multimedia broadcasting (DMB) player.

9. A method of controlling a portable audio device by using a wireless headset, the method comprising:
   sensing a signal transmitted by the wireless headset requesting reproduction of an audio file;
   transmitting a host wake-up (HOST_WAKEUP) signal according to the sensed signal requesting the reproduction of the audio file;
   transmitting a control signal to a power control unit of the portable audio device according to the host wake-up signal to supply power to the audio codec unit;
   transmitting a reset signal to initialize the audio codec unit;
   performing at least one of decoding or encoding of the audio file according to the reset signal using the audio codec unit to which the power is supplied;
   transmitting the audio file on which at least one of the decoding or the encoding has been performed to the wireless communication unit through a host interface; and
   transmitting the audio file on which at least one of the decoding or the encoding has been performed to the wireless headset using the wireless communication unit,
   wherein the power is not supplied to the audio codec unit of the portable audio device when the portable audio device is in a low-power mode.

10. An apparatus to control a portable audio device in a power-saving mode using a wireless headset, the apparatus comprising:
    a wireless communication unit of the portable audio device to transmit a host wake-up signal (HOST_WAKEUP) according to a signal transmitted by the wireless headset requesting reproduction of an audio file;
    a logic circuit unit of the portable audio device to transmit a control signal corresponding to the host wake-up signal transmitted by the wireless communication unit; and
    a power control unit of the portable audio device to control the portable audio device according to the control signal transmitted by the logic circuit unit by switching the portable audio device out of the power-saving mode and supplying power to at least one component of the portable audio device used to reproduce the audio file,
    wherein the logic circuit unit is turned on in a power-saving mode and the at least one component used to reproduce the audio file is turned off in the power-saving mode.

11. The apparatus of claim 10, further comprising an audio codec unit of the portable audio device to receive the power supplied according to the control signal, to initialize the portable audio device according to a reset signal transmitted by the logic circuit unit, to perform at least one of decoding or encoding of the audio file, and to transmit the audio file on which at least one of the decoding or the encoding has been performed to the wireless communication unit through a host interface.

12. The apparatus of claim 11, wherein the audio codec unit loads a predetermined application program to reproduce the audio file before performing at least one of the decoding or the encoding of the audio file.

13. The apparatus of claim 11, wherein the audio codec unit comprises a software decoder or a hardware decoder comprising a digital signal processor (DSP) or a central processing unit (CPU) to perform the decoding of the audio file.

14. The apparatus of claim 13, wherein the audio codec unit further comprises an MP3 encoder or a sub-band coding (SBC) encoder to perform the encoding of the audio file.

15. The apparatus of claim 10, wherein the logic circuit unit comprises at least one of a complex programmable logic device (CPLD), a microcomputer (MICOM), or a power management system (PMS) dedicated module.

16. The apparatus of claim 10, wherein the wireless communication unit comprises at least one of a Bluetooth module, a Zigbee module, a WiFi module, or an open system interconnection (OSI) communication module.

17. A method of controlling a portable audio device in a power-saving mode using a wireless headset, the method comprising:
transmitting a signal requesting reproduction of an audio file from the wireless headset to the portable audio device; and
automatically switching the portable audio device out of the power-saving mode by using at least one component in the portable audio device which is turned on during the power-saving mode to process the signal requesting reproduction,
wherein at least one other component in the portable audio device used to reproduce the audio file is not turned on during the power-saving mode.

18. The method of claim 17, further comprising:
transmitting a host wake-up signal according to the transmitting of the signal requesting reproduction of an audio file; and
transmitting a control signal corresponding to the host wake-up signal from the at least one component, wherein the control signal supplies power to the at least one other component in the portable audio device used to reproduce the audio file which is not turned on during the power-saving mode.

19. The method of claim 18, wherein the at least one component comprises a logic circuit unit.

20. The method of claim 19, wherein the at least one other component comprises at least one of an audio codec unit, a DRAM, a hard disk drive (HDD), or a flash memory.

21. The method of claim 18, further comprising:
supplying the power to an audio codec unit of the portable audio device according to the control signal;
transmitting a reset signal to initialize the audio codec unit;
performing at least one of decoding or encoding of the audio file using the audio codec unit;
transmitting the audio file on which at least one of the decoding or the encoding has been performed to a wireless communication unit of the portable audio device through a host interface; and
transmitting the audio file on which at least one of the decoding or the encoding has been performed to the wireless headset through a wireless channel using the wireless communication unit.

22. The method of claim 17, wherein the power-saving mode comprises one of a sniff mode or a park mode.

23. A system to wirelessly reproduce an audio file, the system comprising:
a wireless headset to transmit a signal requesting reproduction of an audio file and to convert the reproduced audio file into sound; and
a portable audio device to reproduce the audio file and to transmit the reproduced audio file to the wireless headset,
wherein the portable audio device comprises at least one component which is turned on during a power-saving mode to process the signal requesting reproduction, and
wherein at least one other component in the portable audio device used to reproduce the audio file is turned off in the power-saving mode.

24. The system of claim 23, wherein the portable audio device comprises:
a wireless communication unit to transmit a host wake-up signal according to the signal requesting reproduction of the audio file; and
a power control unit to switch the portable audio device out of the power-saving mode by supplying power to the at least one other component used to reproduce the audio file which is turned off in the power-saving mode according to a control signal transmitted by the at least one component according to the host wake-up signal.

* * * * *